US009590248B2

United States Patent
Amine et al.

(10) Patent No.: US 9,590,248 B2
(45) Date of Patent: Mar. 7, 2017

(54) POROUS GRAPHENE NANOCAGES FOR BATTERY APPLICATIONS

(71) Applicant: UChicago Argonne, LLC, Chicago, IL (US)

(72) Inventors: Khalil Amine, Oak Brook, IL (US); Jun Lu, Bolingbrook, IL (US); Peng Du, Woodbridge, IL (US); Jianguo Wen, Naperville, IL (US); Larry A. Curtiss, Downers Grove, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 752 days.

(21) Appl. No.: 13/796,672

(22) Filed: Mar. 12, 2013

(65) Prior Publication Data

US 2014/0272610 A1    Sep. 18, 2014

(51) Int. Cl.
*H01M 4/583* (2010.01)
*H01M 4/58* (2010.01)
*H01M 4/136* (2010.01)
*H01M 10/052* (2010.01)
*H01M 12/08* (2006.01)

(52) U.S. Cl.
CPC ........... *H01M 4/583* (2013.01); *H01M 4/136* (2013.01); *H01M 4/5815* (2013.01); *H01M 10/052* (2013.01); *H01M 12/08* (2013.01)

(58) Field of Classification Search
CPC .................. H01M 4/583–4/587; H01M 4/133
See application file for complete search history.

(56) References Cited

U.S. PATENT DOCUMENTS

| | | | |
|---|---|---|---|
| 8,313,721 B2 | 11/2012 | Thackeray et al. | |
| 2006/0257737 A1 | 11/2006 | Goh et al. | |
| 2011/0256049 A1 | 10/2011 | Dickinson et al. | |
| 2012/0068124 A1 | 3/2012 | Dickinson et al. | |
| 2012/0264017 A1* | 10/2012 | Nazri ................. | H01M 4/0423 429/218.1 |
| 2013/0071761 A1 | 3/2013 | Amine et al. | |

OTHER PUBLICATIONS

Fergus, Jeffery, "Recent developments in cathode materials for lithium ion batteries", Journal of Power Sources, 2010, pp. 939-954.
(Continued)

*Primary Examiner* — Maria J Laios
*Assistant Examiner* — Robert S Carrico
(74) *Attorney, Agent, or Firm* — Foley & Lardner LLP

(57) ABSTRACT

An active material composition includes a porous graphene nanocage and a source material. The source material may be a sulfur material. The source material may be an anodic material. A lithium-sulfur battery is provided that includes a cathode, an anode, a lithium salt, and an electrolyte, where the cathode of the lithium-sulfur battery includes a porous graphene nanocage and a sulfur material and at least a portion of the sulfur material is entrapped within the porous graphene nanocage. Also provided is a lithium-air battery that includes a cathode, an anode, a lithium salt, and an electrolyte, where the cathode includes a porous graphene nanocage and where the cathode may be free of a cathodic metal catalyst.

8 Claims, 11 Drawing Sheets

(56) References Cited

OTHER PUBLICATIONS

Li, et al., "Effect of Over-discharge on Swelling and Recharge Performance of Lithium Ion Cells", Chinese Journal of Chemistry, 2008, pp. 1585-1588.

Li, et al., "Synthesis, characterization and application of carbon nanocages as anode materials for high-performance lithium-ion batteries", The Royal Society of Chemistry, 2012,2, pp. 284-291.

Tao et al., "Reality and Future of Rechargeable Lithium Batteries", The Open Materials Science Journal, 2011, pp. 204-214.

Wang et al., "Carbon nanocages with nanographene shell for high-rate lithium ion batteries", J. Mater. Chem., 2010,20, pp. 9748-9753.

Whittingham, M. Stanley, "Lithium Batteries and Cathode Materials", Chemistry Review, 2004, pp. 4271-4301.

Yan et al., "Co3O4 Nanocages for High-Performance Anode Material in Lithium-Ion Batteries", J. Phys. Chem. C, 2012, 116(12), pp. 7227-7235.

\* cited by examiner

POROUS GRAPHENE NANOCAGES FOR BATTERY APPLICATIONS

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries. More particularly, the present technology is related to electroactive materials that include porous graphene nanocages, Li—S batteries and Li-air batteries.

SUMMARY

In one aspect, an active material composition is provided that includes a porous graphene nanocage and a source material. The source material may be a sulfur material. The source material may be an anodic material. In some embodiments, at least a portion of the source material is entrapped within the porous graphene nanocage. In some embodiments, the sulfur material includes sulfur, $M^1_xS_m$, $M^2_xS_m$, or $M^3_xS_m$, or a mixture of any two or more thereof; where $M^1$ is an alkali metal; $M^2$ is a transition metal; $M^3$ is a metal from groups 13 to 17 of the periodic table; each x independently is an integer from 1 to 3; and each m independently is an integer from 1 to 10. In some embodiments, the sulfur material includes sulfur, $Li_2S$, $Li_2S_2$ $Na_2S$, $Na_2S_2$, $Li_2S_n$, or $Na_2S_n$, or a mixture of any two or more thereof, where n is an integer from 3 to 6. In embodiments where the source material is a sulfur material, the composition may be a cathode material. In embodiments where the source material is a sulfur material and the composition is a cathode material, the composition may be free of a cathodic metal catalyst. In some embodiments, the anodic material includes a Li metal, Si, Si—C, SiO, a silicon alloy, Sn, Sb, tin oxide, a tin carbon, a composite tin alloy, $Li_4Ti_5O_{12}$, a transition metal oxide, a lithium metal nitride, or a mixture of any two or more thereof. In some embodiments, at least a portion of the anodic material is entrapped in the porous graphene nanocage and includes Si, Si—C, SiO, or a silicon alloy, or a mixture of any two or more thereof. In some embodiments, at least a portion of the anodic material becomes entrapped in the porous graphene nanocage through use of the composition in an electrochemical device.

In another aspect, a sodium ion battery is provided that includes a cathode, an anode, and an electrolyte that includes a sodium salt, where the anode includes a porous graphene nanocage and an anodic material. In some embodiments, at least a portion of the anodic material is entrapped in the porous graphene nanocage. In some embodiments, the anodic material includes Na, a sodium alloy, Sb, an antimony alloy, $Fe_3O_4$, Si, Si—C, SiO, a silicon alloy, or a mixture of any two or more thereof.

In another aspect, a magnesium battery is provided that includes a cathode, an anode, and an electrolyte that includes a magnesium salt, where the anode includes a porous graphene nanocage and an anodic material. In some embodiments, at least a portion of the anodic material is entrapped in the porous graphene nanocage. In some embodiments, the anodic material includes Mg, Si, Si—C, $Mg_2Si$, SiO, a silicon alloy, Sn, SnO, or a mixture of any two or more thereof.

In another aspect, a lithium-sulfur battery is provided that includes a cathode, an anode, a lithium salt, and an electrolyte. The cathode of the lithium-sulfur battery includes a porous graphene nanocage and a sulfur material, where at least a portion of the sulfur material is entrapped within the porous graphene nanocage. In some embodiments, the electrolyte includes ethylene carbonate, dimethylcarbonate, diethylcarbonate, propylene carbonate, dioxolane, γ-butyrolactone, δ-butyrolactone, dimethyl ether, a silane, siloxane, N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile, or a mixture of any two or more such solvents. In some embodiments, the electrolyte includes 1-[1-trimethylsiloxanylethyl]ethylene carbonate, tetraethylene glycol dimethyl ether, or a mixture thereof. In some embodiments, the lithium salt includes $LiPF_6$, $LiClO_4$, $Li[B(C_2O_4)_2]$, $Li[BF_2(C_2O_4)]$, $Li[PF_4(C_2O_4)]$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, $LiAlF_4$, $LiBF_4$, $Li(FSO_2)_2N$, $Li_2SO_4$, $Na_2SO_4$, $NaPF_6$, $NaClO_4$, $LiAlO_2$ $LiSCN$, $LiBr$, $LiI$, $LiAsF_6$, $LiB(Ph)_4$, $LiSO_3CH_3$, $Li_2S_{x''}$, $Li_2Se_{x''}$, $(LiS_{x''}R)_y$, or $(LiSe_{x''}R)_y$; where X is a halogen; n is an integer from 0 to 12; n' is an integer from 0 to 10; x" is an integer from 1 to 20; y is an integer from 1 to 3; and R is H, alkyl, alkenyl, aryl, ether, F, $CF_3$, $COCF_3$, $SO_2CF_3$, or $SO_2F$. In some embodiments, the capacity of the battery is greater than 600 mAh/g.

In another aspect, a lithium-air battery is provided that includes a cathode, an anode, a lithium salt, and an electrolyte, where the cathode includes a porous graphene nanocage. In some embodiments, the cathode is free of a cathodic metal catalyst. In some embodiments, the electrolyte includes ethylene carbonate, dimethylcarbonate, diethylcarbonate, propylene carbonate, dioxolane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile, or a mixture of any two or more thereof. In some embodiments, the electrolyte includes 1-[1-trimethylsiloxanylethyl]ethylene carbonate, tetraethylene glycol dimethyl ether, or a mixture thereof. In some embodiments, the lithium salt includes $LiPF_6$, $LiClO_4$, $Li[B(C_2O_4)_2]$, $Li[BF_2(C_2O_4)]$, $Li[PF_4(C_2O_4)]$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, $LiAlF_4$, $LiBF_4$, $Li(FSO_2)_2N$, $Li_2SO_4$, $Na_2SO_4$, $NaPF_6$, $NaClO_4$, $LiAlO_2$ $LiSCN$, $LiBr$, $LiI$, $LiAsF_6$, $LiB(Ph)_4$, $LiSO_3CH_3$, $Li_2S_{x''}$, $Li_2Se_{x''}$, $(LiS_{x''}R)_y$, or $(LiSe_{x''}R)_y$; where X is a halogen; n is an integer from 0 to 12; n' is an integer from 0 to 10; x" is an integer from 1 to 20; y is an integer from 1 to 3; and R is H, alkyl, alkenyl, aryl, ether, F, $CF_3$, $COCF_3$, $SO_2CF_3$, or $SO_2F$. In some embodiments, the capacity of the battery is greater than 600 mAh/g. In some embodiments, $Li_2O$, $Li_2O_2$, or a mixture thereof are entrapped within the porous graphene nanocage upon discharge of the battery.

In another aspect, a fuel cell is provided that includes a cathodic material and an anodic material, wherein a porous graphene nanocage is at least one component of the cathodic material, the anodic material, or a component of both the cathodic material and the anodic material.

In another aspect, a method for producing a porous graphene nanocage with an entrapped material is provided, involving contacting a porous graphene nanocage with a source material, where the entrapped source material is a material other than MgO and the contacting entraps at least a portion of the source material in the porous graphene nanocage. In some embodiments, the material is sulfur. In some embodiments, the contacting occurs at a temperature of at least 100° C. In some embodiments, the contacting occurs at a temperature of at least 200° C.

DETAILED DESCRIPTION

Figure 1A:
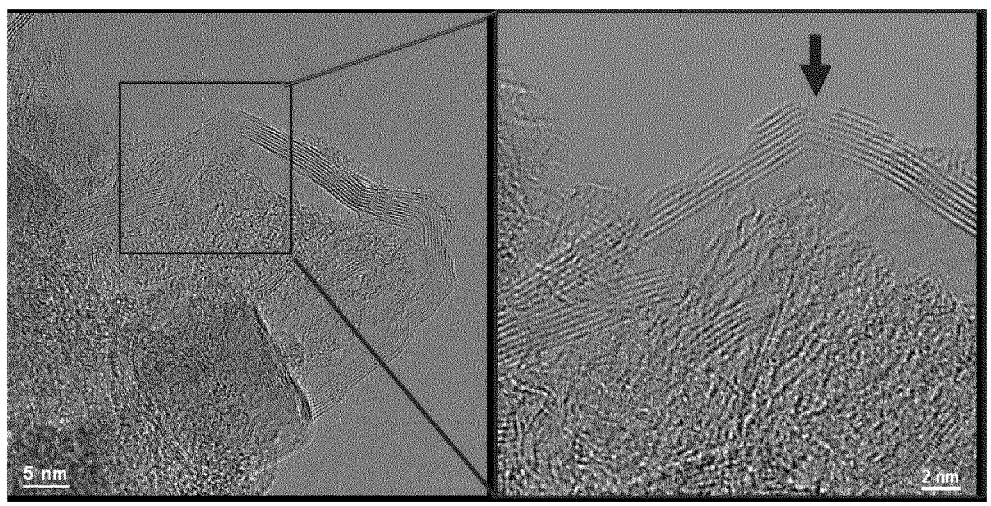
FIGS. 1A, 1B, and 1C are Transmission Electron Microscope (TEM) images of hollow porous graphene nanocages showing the graphene layers and pathways provided by acid etching, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, carbonyls (oxo); carboxyls; esters; urethanes; oximes; hydroxylamines; alkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

Alkynyl refers to straight and branched chain groups such as those described with respect to alkyl groups as defined above, except that at least one triple bond exists between two carbon atoms. Examples include, but are not limited to —C≡CH, —C≡C($CH_3$), —C≡C($CH_2CH_3$), —$CH_2$C≡CH, —$CH_2$C≡C($CH_3$), and —$CH_2$C≡C($CH_2CH_3$) among others. Typical unsubstituted alkynyl groups have form 2 to 20 carbons, and can have from 2 to 10 carbons. Alkynyl groups may be substituted.

The phrase "substituted alkynyl" has the same meaning with respect to unsubstituted alkynyl groups that substituted alkyl groups had with respect to unsubstituted alkyl groups. A substituted alkynyl group includes alkynyl groups in which a non-carbon or non-hydrogen atom is bonded to a carbon triple bonded to another carbon and those in which a non-carbon or non-hydrogen atom is bonded to a carbon not involved in a triple bond to another carbon.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Haloalkyl groups include alkyl groups as defined above in which 1 or more of the hydrogen atoms are replaced by a halogen (i.e., F, Cl, Br, or I). In some embodiments the haloalkyl group bears from 1 to 3 halogens. In others, the haloalkyl is perhalogenated such as perfluorinated or perchlorinated. Examples of haloalkyl groups include but are not limited to —$CH_2Cl$, —$CH_2F$, —$CF_3$, —$CH_2CH_2Br$, and —$CH_2CF_3$.

The present technology provides porous graphene nanocages for use in electrochemical devices. Exemplary electrochemical devices are Li—S batteries and Li-air batteries. Through the incorporation of porous graphene nanocages, the electrochemical devices exhibit a low charge potential that gives rise to high electrical efficiency and excellent recyclability. For example, a Li—S battery that uses porous graphene nanocages with entrapped sulfur as a cathode material possesses excellent cyclability and capacity retention with a near 100% columbic efficiency. Without being bound by theory, it is believed that entrapping the sulfur within the porous graphene nanocage prevents the shuttling effect of polysulfides, thereby providing enhanced cyclability, efficiency, and capacity. In Li-air batteries that use porous graphene nanocages as a cathode display a low charge potential that gives rise to high electrical efficiency and repeated cycling. Without being bound by theory, it is believed the porous graphene nanocages entrap discharged lithium peroxide and lithium oxide particles, preventing them from reducing the reversibility and energy density of the Li-air battery.

Porous graphene nanocages are a carbon family that may be used as a cathode support material for Li—$O_2$ or Li—S battery applications. The use of such cathodes in Li—$O_2$ or Li—S batteries provides high electrical efficiencies and excellent recyclability of the batteries. The porous graphene nanocage have an average size of about 1 nm to about 200 nm in diameter. This may include porous graphene nanocages from about 1 nm to about 100 nm in diameter and from about 1 nm to about 50 nm in diameter. This may include porous graphene nanocages having an average size diameter of about 1 nm to about 40 nm, from about 1 nm to about 30 nm, from about 2 nm to about 50 nm, from about 2 nm to about 40 nm, from about 2 nm to about 30 nm, from about 5 nm to about 50 nm, from about 5 nm to about 40 nm, from about 5 nm to about 30 nm, from about 10 nm to about 50 nm, and from about 10 nm to about 40 nm. In some embodiments, the porous graphene nanocage has an average diameter from about 10 nm to about 30 nm.

The porous graphene nanocage may include layers of graphene that form the porous graphene nanocage. The layers may range from 2 layers to 20 layers. In some embodiments, the layers range from 2 layers to 10 layers. In some embodiments, the layers range from 2 layers to 7 layers.

The porous graphene nanocages possess pores. The average pore size may be from about 0.5 nm to about 100 nm in diameter. In some embodiments, the average pore size is from about 0.5 nm to about 50 nm. In some embodiments, the average pore size is from about 0.5 nm to about 10 nm. In some embodiments, the average pore size is from about 1 nm to about 50 nm. In some embodiments, the average pore size is from about 10 nm to about 50 nm. In some embodiments, the average pore size is from about 0.5 nm to about 2 nm. In some embodiments, the average pore size is from about 1 nm to about 2 nm.

In another aspect, a method for entrapping a source material in a porous graphene nanocage is provided, where the entrapped material is a material other than MgO. The method involves contacting a porous graphene nanocage with the material. The contacting entraps at least a portion of the source material in the porous graphene nanocage. In some embodiments, the material is sulfur. In some embodiments, the contacting occurs at a temperature of at least 100° C. In some embodiments, the contacting occurs at a temperature of at least 200° C. In some embodiments, the contacting occurs at about 100° C., about 200° C., about 300° C., about 400° C., and any range in between any two of these values and above any one of these values.

Entrapment of the source material may occur prior to the use of the porous graphene nanocage in an electrochemical device, upon using the porous graphene nanocage in the electrochemical device, or both. In embodiments where the entrapment occurs prior to use, the entrapment may occur by allowing the molten form of the source material to enter the porous graphene nanocage. In such embodiments, the source material may be sulfur. In embodiments where entrapment occurs prior to use, the entrapment includes gas phase diffusion of the source material into the porous graphene nanocage. In such embodiments, the source material may be sulfur. In some embodiments, the contacting occurs at a temperature of at least 100° C. In some embodiments, the contacting occurs at a temperature of at least 200° C. The source material may be entrapped in the interior of the porous graphene nanocage, between the graphene layers of the porous graphene nanocage, or both inside the porous graphene nanocage and between the graphene layers of the porous graphene nanocage. In such embodiments, the source material may be sulfur.

It is to be understood that "entrapped" encompasses both the prevention of and resistance to the movement of a potentially mobile species outside an entrapping species. Thus, in some embodiments, the potentially mobile species is prevented from freely diffusing from within an entrapping species to the environment outside the entrapping species. It is also appreciated that the various modes of preventing or resisting movement, such as diffusion, can mean "substantial" prevention or resistance, which includes total but also less than total prevention of or resistance to movement of a potentially mobile species. Furthermore, prevention or resistance can refer to a preventative measure in which the object is to lessen the possibility of movement. For example, a material is entrapped within a porous graphene nanocage if the nanocage slows, or prevents movement of the material from a first location within the porous graphene nanocage to a second location outside the porous graphene nanocage in comparison to the movement of a material from the first location to the second location when the porous graphene nanocage is not present.

Where entrapment of a source material occurs during use of the porous graphene nanocage in an electrochemical device, the entrapment may occur due to charging, discharging, or a combination thereof, of the electrochemical device. Thus, in some embodiments, the entrapment occurs upon discharge of an electrochemical device. In such embodiments, the source material may be $Li_2O$, $Li_2O_2$, or mixtures thereof. In such embodiments, the source material may be a Li metal, Si, Si—C, $Mg_2Si$, SiO, a silicon alloy (such as SiCu or SiMo), Sn, Sb, tin oxide, a tin carbon, a composite tin alloy, $Li_4Ti_5O_{12}$, a transition metal oxide, or a lithium metal nitride, or a mixture of any two or more thereof. In such embodiments, the source material may be Si, Si—C, SiO, or a silicon alloy, or a mixture of any two or more thereof.

In another aspect, an active material composition is provided, the composition including a porous graphene nanocage and a source material. The source material may be a sulfur material. At least a portion of the sulfur material may be entrapped in the porous graphene nanocage. In some embodiments, over 90% of the sulfur is entrapped in the porous graphene nanocage. In some embodiments, about 100% of the sulfur is entrapped in the porous graphene nanocage. The sulfur material may include sulfur, $M^1_xS_m$, $M^2_xS_m$, $M^3_xS_m$, and mixtures of any two or more thereof, where $M^1$ is an alkali metal, $M^2$ is a transition metal, $M^3$ is a metal from groups 13 to 17 of the periodic table, each x independently is an integer from 1 to 3, and each m independently is an integer from 1 to 10. In some embodiments, the sulfur material includes sulfur, $Li_2S$, $Li_2S_2$, $Na_2S$, $Na_2S_2$, $Li_2S_n$, $Na_2S_n$ and mixtures of any two or more thereof, wherein n is an integer from 3 to 6. The sulfur material may be entrapped in the interior of the porous graphene nanocage, in between the graphene layers of the porous graphene nanocage, or both. In some embodiments, the sulfur material is elemental sulfur. In some embodiments where the source material is a sulfur material, the active material composition is a cathode material. In embodiments where the source material is a sulfur material and the composition is a cathode material, the composition may be free of a cathodic metal catalyst. Cathodic metal catalysts are described more fully herein in the context of lithium air batteries.

The source material may be an anodic material. In some embodiments, the anodic material includes a Li metal, $Fe_3O_4$, Mg, Na, a sodium alloy, Si, Si—C, $Mg_2Si$, SiO, a silicon alloy (such as SiCu or SiMo), Sn, SnO, Sb, an antimony alloy, a tin carbon, a composite tin alloy, $Li_4Ti_5O_{12}$, a transition metal oxide, a lithium metal nitride or a mixture of any two or more thereof. In some embodiments, the anodic material is a Li metal, Na, a sodium alloy, a silicon material, or a mixture or combination thereof. At least a portion of the anodic material may be entrapped within the porous graphene nanocage. The anodic material may be entrapped in the interior of the porous graphene nanocage, in between the graphene layers of the porous graphene nanocage, or both. In some embodiments, the anodic material is entrapped prior to use of the composition. In some embodiments, the anodic material may become entrapped upon charging and/or discharging a device that incorporates the active material composition. In some embodiments, the entrapped anodic material includes Si, Si—C, SiO, a silicon alloy, or a mixture of any two or more thereof.

In another aspect, a sodium ion battery is provided that includes a cathode, an anode, and an electrolyte that includes a sodium salt, where the anode includes a porous graphene nanocage and an anodic material. Exemplary sodium salts for the electrolyte of the sodium ion battery include, but are not limited to, $NaClO_4$ and $NaPF_6$. In some embodiments, at least a portion of the anodic material is entrapped in the porous graphene nanocage. In some embodiments, the anodic material includes Na, a sodium alloy, Sb, an antimony alloy, $Fe_3O_4$, Si, Si—C, SiO, a silicon alloy, or a mixture of any two or more thereof.

In an aspect, a magnesium battery is provided that includes a cathode, an anode, and an electrolyte that includes a magnesium salt, where the anode includes a porous graphene nanocage and an anodic material. An exemplary magnesium salt that may be used in the electrolyte of the magnesium battery includes, but is not limited to, $MgCl_2$. In some embodiments, at least a portion of the anodic material is entrapped in the porous graphene nanocage. In some embodiments, the anodic material includes Mg, Si, Si—C, $Mg_2Si$, SiO, a silicon alloy (e.g. SiCu or SiMo), Sn, SnO, or a mixture of any two or more thereof.

Typical electrolytes for the sodium and magnesium batteries include a non-aqueous polar aprotic solvent. Illustrative polar aprotic solvents include, but are not limited to, ethylene carbonate, dimethylcarbonate, diethylcarbonate, propylene carbonate, dioxolane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, and adiponitrile.

In another aspect, a lithium-sulfur battery is provided that includes a cathode, an anode, a lithium salt, and an electrolyte. The cathode of the lithium-sulfur battery includes a porous graphene nanocage and a sulfur material, where at least a portion of the sulfur material is entrapped within the porous graphene nanocage.

In another aspect, a lithium-air battery is provided that includes a cathode, an anode, a lithium salt, and an electrolyte, where the cathode includes a porous graphene nanocage (i.e. as a first carbon material). The cathode may be free of a cathodic metal catalyst. The structure of the lithium-air batteries with the porous graphene nanocages removes the necessity for inclusion of a metal catalyst to assist in the air-lithium ion reaction. Cathodic metal catalysts that are typically used in traditional lithium-air batteries include materials such as Pd, Pt, Au, Ag, Ir, Rh, Ru or metal oxides thereof, as well as PdO, NiO, $Ni_2O_3$, MnO, $Mn_2O_3$, $MnO_2$, CuO, $Cu_2O$, $Co_3O_4$, $Co_2O_3$, FeO, $Fe_3O_4$, but which are excluded from the lithium-air batteries with a metal catalyst-free cathode described above The cathode for both lithium-sulfur and lithium-air batteries may also include a current collector, a second carbon material in addition to the porous graphene nanocage, and/or a polymeric binder. The current collector may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. The carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, and Ketjen black. The polymeric binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

Anodic materials may include porous graphene nanocages, graphite, Li metal, Si, Si—C, $Mg_2Si$, SiO, a silicon alloy (such as SiCu or SiMo), Sn, Sb, an antimony allow, tin oxide, $Li_4Ti_5O_{12}$, and the like. The anodic materials may include the active material compositions described above. In addition to a cathode and anode, the batteries may include a separator. Illustrative separators include, but are not limited to, polyethylene, polypropylene, or polyvinylidene fluoride (PVDF).

Typical electrolytes for the lithium-sulfur and lithium-air batteries include a non-aqueous polar aprotic solvent and a lithium salt. Illustrative polar aprotic solvents include, but are not limited to, ethylene carbonate, dimethylcarbonate, diethylcarbonate, propylene carbonate, dioxolane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, and adiponitrile. A mixture of any two or more of these individual solvents may be used as the electrolyte of the Li-air battery. In some embodiments, the electrolyte includes, but is not limited to, 1-[1-trimethylsiloxanylethyl]ethylene carbonate (1NM3), $CF_2HCF_2OCH_2CF_2CF_2H$, propylene carbonate, dimethoxyethane, dimethylformamide, dimethylacetamide, dimethylsulfoxide, 1,3-dioxolane, tetraethylene glycol dimethyl ether (TEGDME), or mixtures of any two or more thereof. In some embodiments, the electrolyte includes, but is not limited to, 1NM3, $CF_2HCF_2OCH_2CF_2CF_2H$, 1,3-dioxolane, TEGDME, or mixtures of any two or more thereof. In some embodiments, the electrolyte includes, but is not limited to, 1NM3, TEGDME, or a mixture thereof.

Suitable lithium salts for the electrolytes include, but are not limited to, $LiPF_6$, $LiClO_4$, $Li[B(C_2O_4)_2]$, $Li[BF_2(C_2O_4)]$, $Li[PF_4(C_2O_4)]$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $LiBF_4$, $Li(FSO_2)_2N$, $Li_2SO_4$, $Na_2SO_4$, $NaPF_6$, $NaClO_4$, $LiAlO_2$, LiSCN, LiBr, LiI, $LiAsF_6$, $LiB(Ph)_4$, $LiSO_3CH_3$, $Li_2S_{x'''}$, $Li_2Se_{x'''}$, $(LiS_{x''}R)_{y'}$, and $(LiSe_{x''}R)_{y'}$; where X is a halogen, n is an integer from 0 to 12, and n' is an integer from 0 to 10, x" is an integer from 1 to 20, y is an integer from 1 to 3 and R is H, alkyl, alkenyl, aryl, ether, F, $CF_3$, $COCF_3$, $SO_2CF_3$, or $SO_2F$.

The above lithium-sulfur batteries may have a capacity of greater than 600 mAh/g. This includes embodiments, where the capacity is greater than 650 mAh/g, greater than 700 mAh/g, greater than 750 mAh/g, greater than 800 mAh/g, greater than 900 mAh/g, greater than 1000 mAh/g, greater than 1500 mAh/g, greater than 2000 mAh/g, greater than 2500 mAh/g, and/or greater than 3000 mAh/g.

The above lithium-air batteries may have a capacity of greater than 600 mAh/g. This includes embodiments, where the capacity is greater than 650 mAh/g, greater than 700 mAh/g, greater than 750 mAh/g, greater than 800 mAh/g, greater than 900 mAh/g, greater than 1000 mAh/g, greater than 1500 mAh/g, greater than 2000 mAh/g, greater than 2500 mAh/g, and/or greater than 3000 mAh/g. In some embodiments, $Li_2O$, $Li_2O_2$, or a mixture thereof are entrapped within the porous graphene nanocage upon discharge of the battery.

In another aspect, a fuel cell is provided that includes a cathodic material and an anodic material. In the fuel cell, a porous graphene nanocage is at least one component of the cathodic material, the anodic material, or is a component of both. The porous graphene nanocage may be used as a support for catalysts that facilitate the oxygen reduction reaction.

The present invention, thus generally described, will be understood more readily by reference to the following examples, which are provided by way of illustration and are not intended to be limiting of the present invention.

EXAMPLES

Example 1

A hollow porous graphene nanocage was prepared by the following method. Mg ribbon (3.0 g) was ignited inside a cavity made in a dry ice (i.e. solid $CO_2$) slab and immediately covered up by another dry ice slab. Upon completion of the combustion of Mg in $CO_2$, the black MgO-filled graphene nanocage products were collected and transferred to a beaker containing 1M HCl (100 mL) and stirred in the aqueous HCl solution at room temperature overnight. This last step removes the MgO formed in the combustion and residual Mg metal. The mixture was then filtered and washed with deionized water several times until the pH of the filtrate was neutral. The isolated solid carbon product was dried overnight under high vacuum at 100° C. to yield hollow porous graphene nanocages.

X-ray diffraction spectroscopy of the MgO-filled graphene nanocage yielded peaks at 25.5, 36.3, and 42.3 degrees. The peaks at 25.5 and 36.3 degrees correspond to carbon, and the peak at 42.3 degrees corresponds to MgO. Raman spectroscopy of the MgO-filled graphene nanocage also confirms the presence of porous graphene nanocages: peaks were observed at 1333.2, 1580.7, and 2663.8 $cm^{-1}$ corresponding to the D-band, G-band, and D+G band, respectively.

Figure 1B:
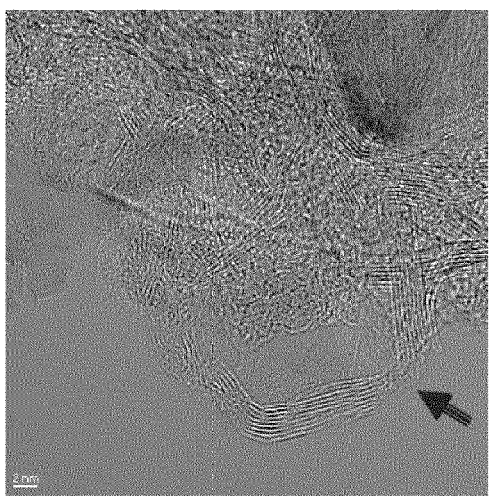
Figure 1C:
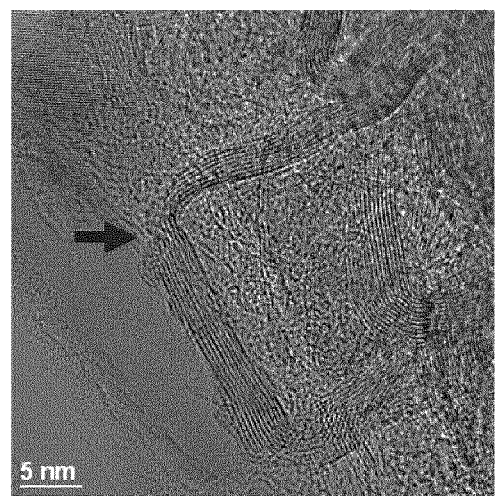
Figure 2A:
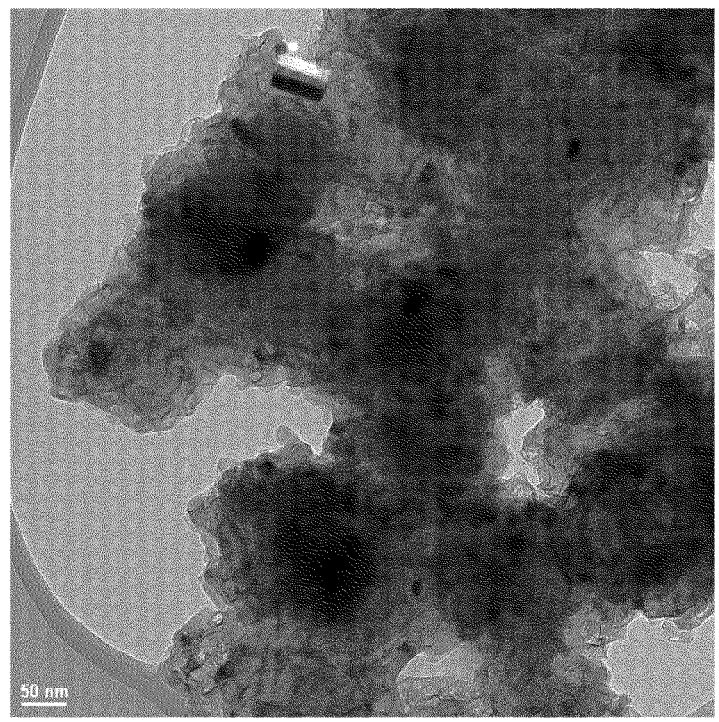
FIGS. 2A and 2B are TEM images of hollow porous graphene nanocages with sizes from about 10 nm to about 30 nm (2A) and the hollow porous graphene nanocages in comparison to a MgO-filled graphene nanocage (2B), according to the examples.
Figure 2B:
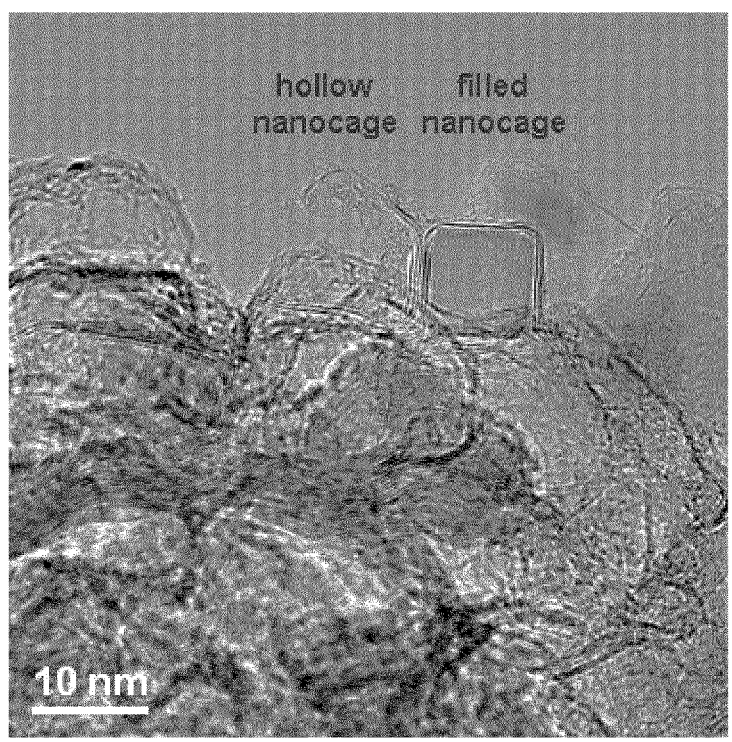

Acid etching of the porous graphene nanocages provides pathways for leaching MgO from the nanocage, resulting in hollow porous graphene nanocages that are free of MgO (FIGS. 1A, 1B, and 1C; pathways are shown by the arrows). The TEM images of FIGS. 1A, 1B, and 1C show that the layers range from 3 layers to 7 layers for these nanocages. FIG. 2A shows a TEM image of the hollow porous graphene nanocages where the nanocages have sizes of about 10 nm to about 30 nm in diameter. FIG. 2B clearly shows the layered hollow porous graphene nanocages in comparison to a MgO-filled porous graphene nanocage (provided for reference). The measured lattice space of the graphene of the porous graphene nanocages is about 3.35 Å, which is in good agreement with the thickness of a graphene monolayer (3.4 Å). The porous graphene nanocages show very good crystallinity.

Example 2

Figure 3A:
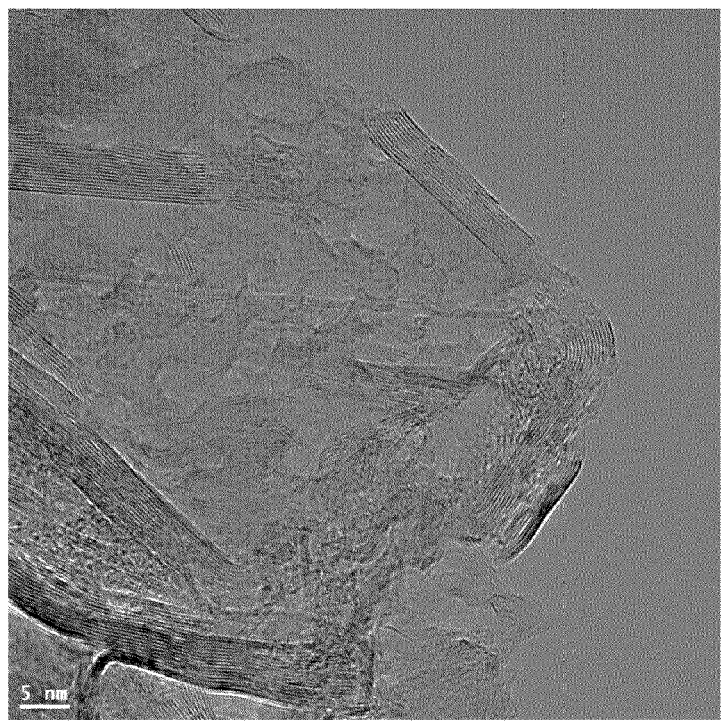
FIGS. 3A and 3B are high-resolution TEM image of a porous graphene nanocage with entrapped sulfur (3A) and a porous graphene nanocage filled with MgO (3B), according to the examples.
Figure 3B:

An active cathode material was prepared from the hollow porous graphene nanocages according to the following procedure. Sulfur powder was combined with the as-prepared hollow porous graphene nanocages and the mixture heated to over 200° C. Without being bound by theory, it is believed that this heating allows molten sulfur to enter into the porous graphene nanocage. High-resolution TEM images are noticeably different for a porous graphene nanocage filled with sulfur (FIG. 3A) in comparison to a porous graphene nanocage filled with MgO (FIG. 3B). FIG. 3A further shows the atomically smooth surface outside the sulfur-filled porous graphene nanocage, indicating that no sulfur is outside the layers of the nanocage. Amorphous materials with some contrast can be observed inside nanocage, both in the interior core and between the graphene layers.

Figure 4A:
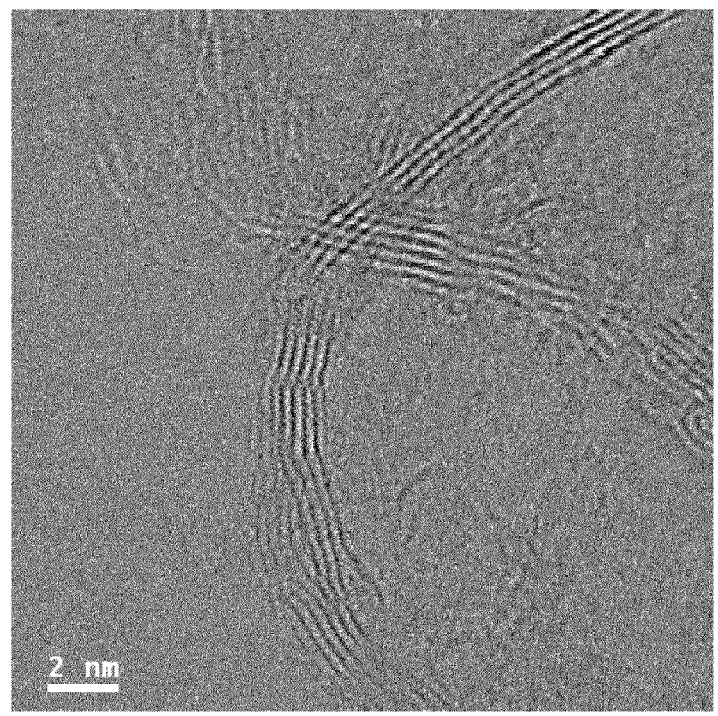
FIGS. 4A and 4B are scanning TEM images of a sulfur-filled nanocage recorded with a Bright-Field detector (4A) and a High Angle Annular Dark-Field (HAADF) detector (4B), according to the examples.

Scanning TEM images of a sulfur-filled nanocage recorded with a Bright-Field detector (FIG. 4A) and a High Angle Annular Dark-Field (HAADF) detector (FIG. 4B) further confirm the presence of sulfur in the porous nanocages. Amorphous materials with some contrast can be observed inside the nanocages in FIG. 4A. The Z-contrast images of these nanocages (FIG. 4B) indicates heavy materials are inside the nanocages and in between the graphene layers of the nanocages (materials heavier than carbon possess higher Z than carbon and thus appear as brighter in the image). Note that bright lines appear in between the graphene layers of the porous nanocage, illustrating that the heavy material is disposed between these graphene layers.

Figure 4B:
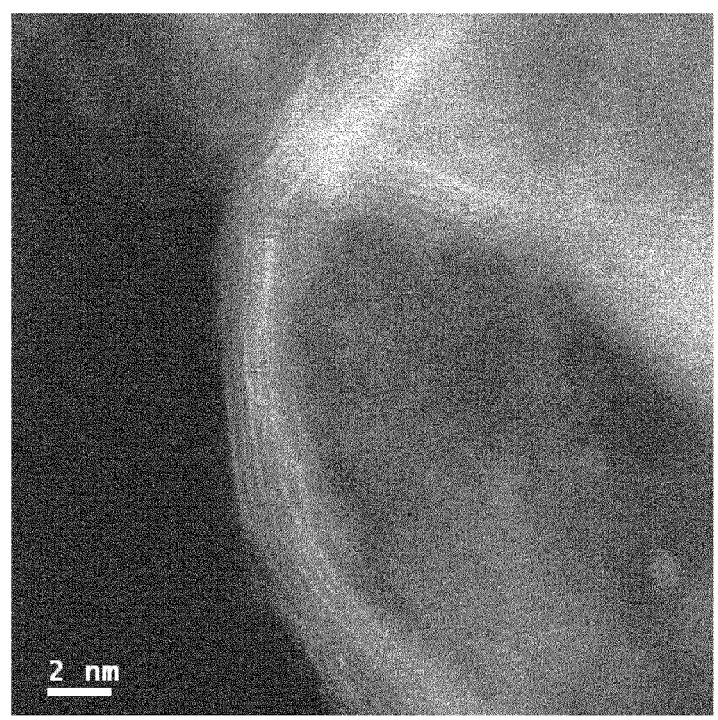

Subsequent X-ray Energy Dispersive Spectra (EDS) confirmed that the heavy material seen in the Z-contrast image of FIG. 4B is sulfur. EDS on the wall of the sulfur-filled graphene nanocage exhibits a peak at 2.3 keV, confirming sulfur on the wall of the graphene nanocage. Similarly, an EDS of the interior core of the sulfur-filled graphene nanocage provides the 2.3 keV peak for sulfur. By comparison, an EDS of a MgO-filled graphene nanocage exhibits no peak at 2.3 keV.

Example 3

Li—S CR2032-type coin cells (1.6 cm$^2$) were made using sulfur-entrapped porous graphene nanocages and their electrochemical performance evaluated. The cathode consisted of 60 wt % sulfur powder, 30 wt % porous graphene nanocages, and 10 wt % poly(vinylidene fluoride) binder on aluminum foil and where the sulfur was entrapped within the porous graphene nanocage. The cells were assembled with lithium metal as the anode and a $CF_2HCF_2OCH_2CF_2CF_2H$: 1,3-dioxolane electrolyte (0.02 mL) was used in each battery. The Li—S coin cells were tested in galvanostatic mode at 30° C. within a voltage range of 1.6-2.6 V using a MACCOR multichannel battery cycler. The charge current and the discharge currents were determined with different rates.

Figure 5A:
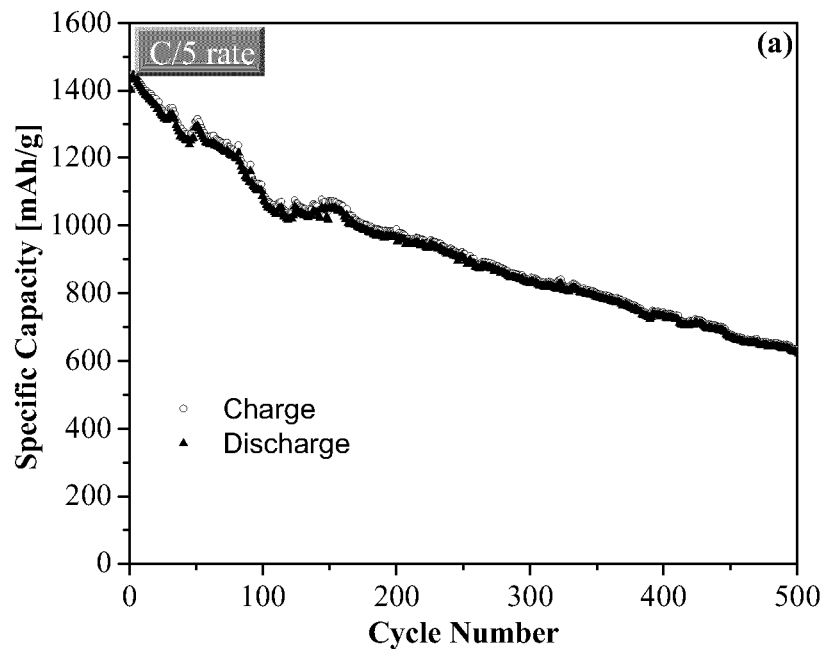
FIGS. 5A and 5B are graphs of the cycling performance of a Li—S cell containing the porous graphene nanocage as the cathode material under a C/5 rate (5A); and the columbic efficiency of the Li—S cell containing the porous graphene nanocage as the cathode material under a C/5 rate (5B), according to the examples.
Figure 5B:
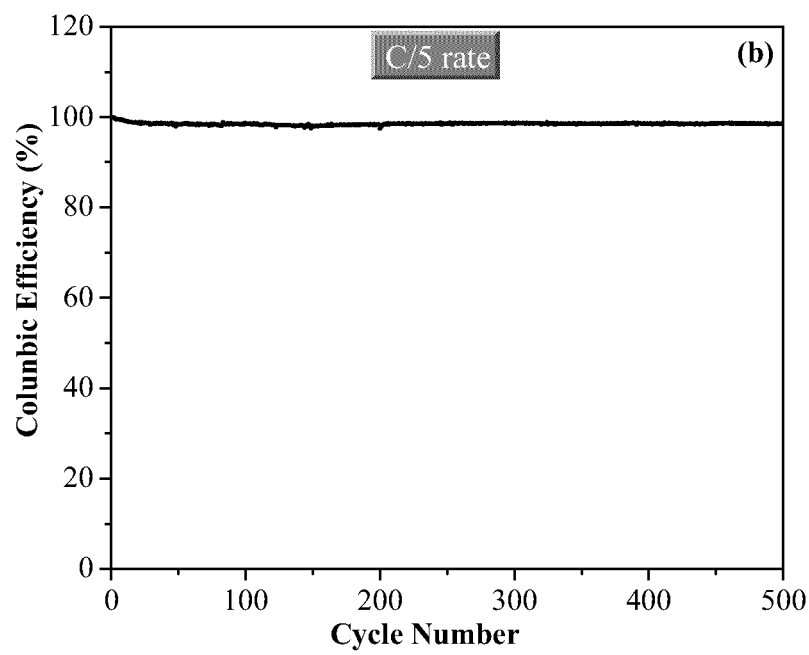
Figure 6:
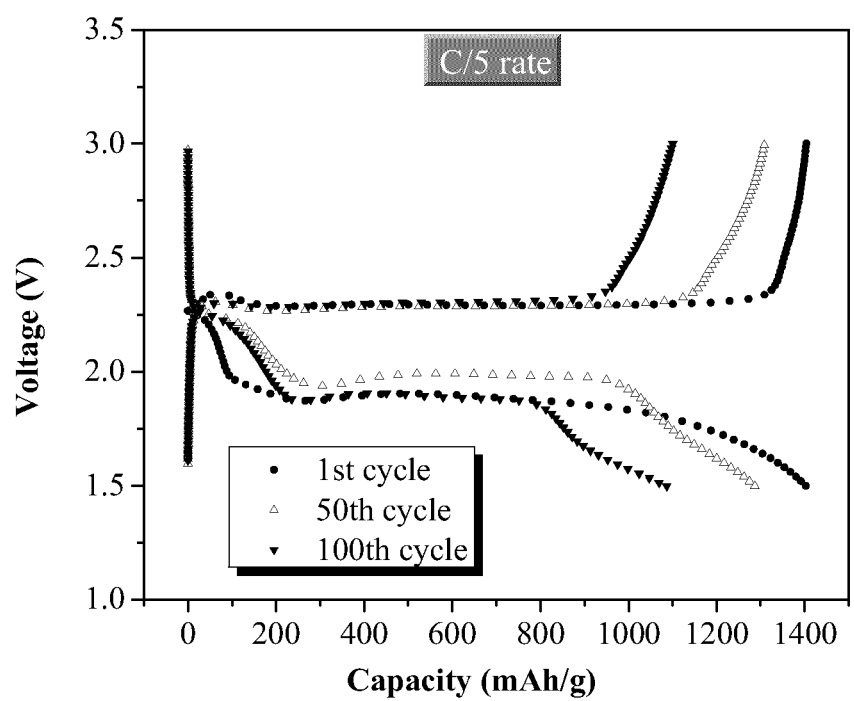
FIG. 6 is a voltage profile during repeated discharge-charge cycles of a Li—S cell containing porous graphene nanocage as the cathode material under a C/5 rate, according to the examples.
Figure 7A:
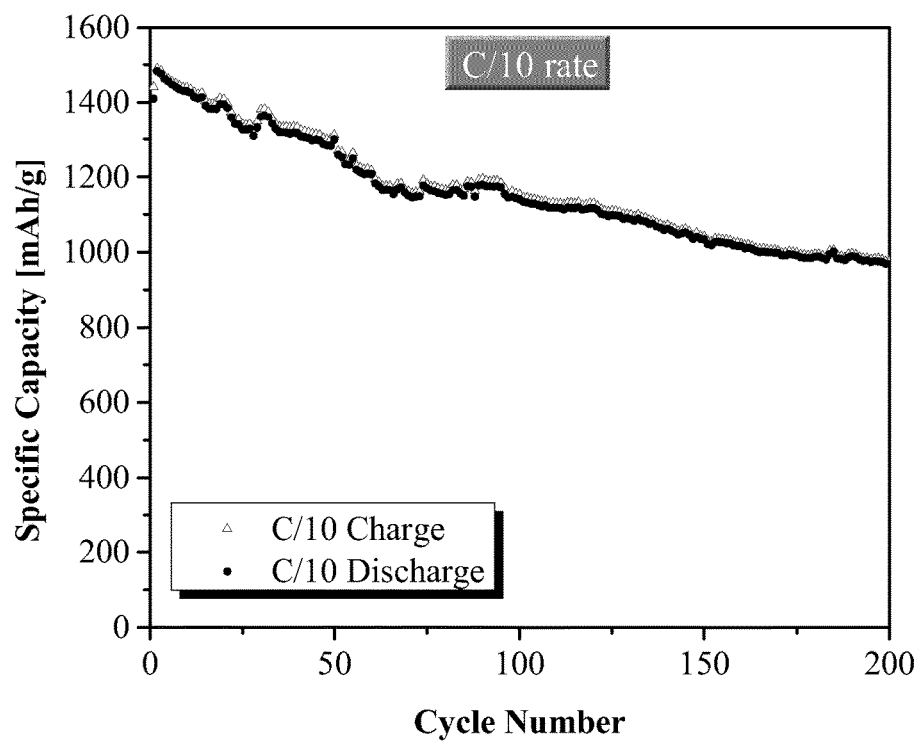
FIGS. 7A and 7B are graphs illustrating the cycling performance of a Li—S cell containing the porous graphene nanocage as the cathode material under a C/10 rate (7A); and the columbic efficiency of a Li—S cell containing the porous graphene nanocage as the cathode material under a C/10 rate (7B), according to the examples.
Figure 7B:
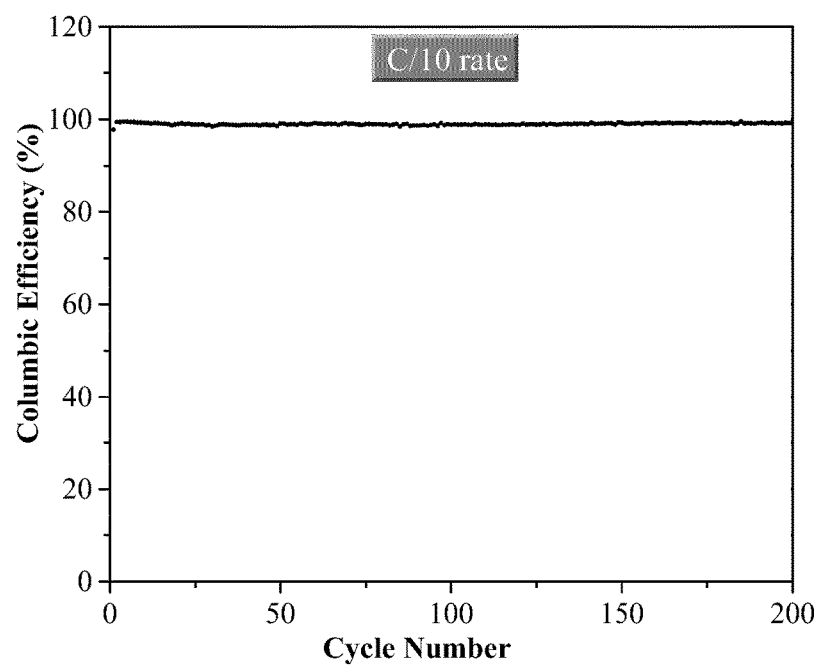
Figure 8:
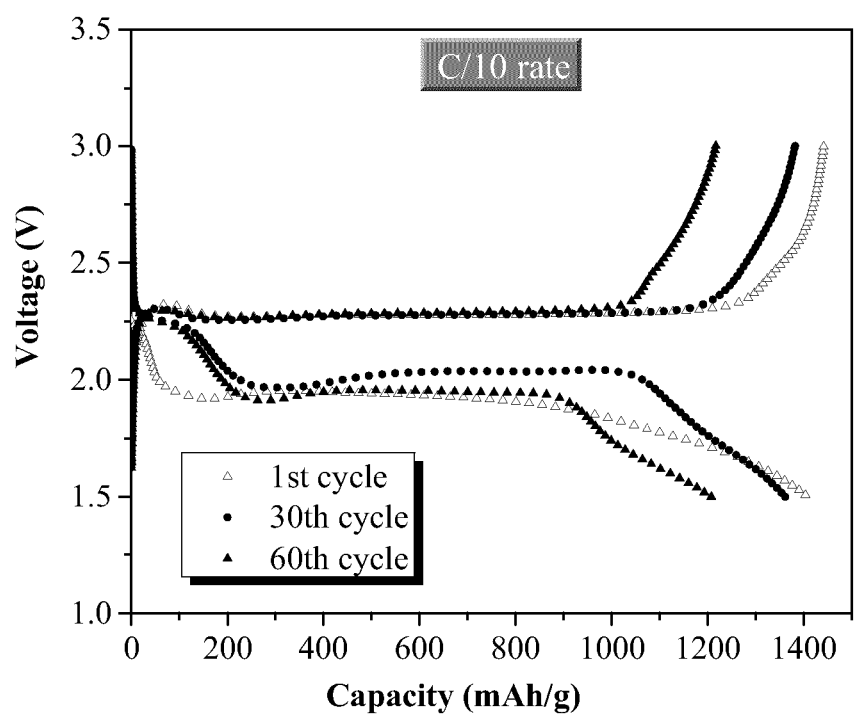
FIG. 8 is a graph of the voltage profile during repeated discharge-charge cycles of a Li—S cell containing the porous graphene nanocage as the cathode material under a C/10 rate, according to the examples.
Figure 9:
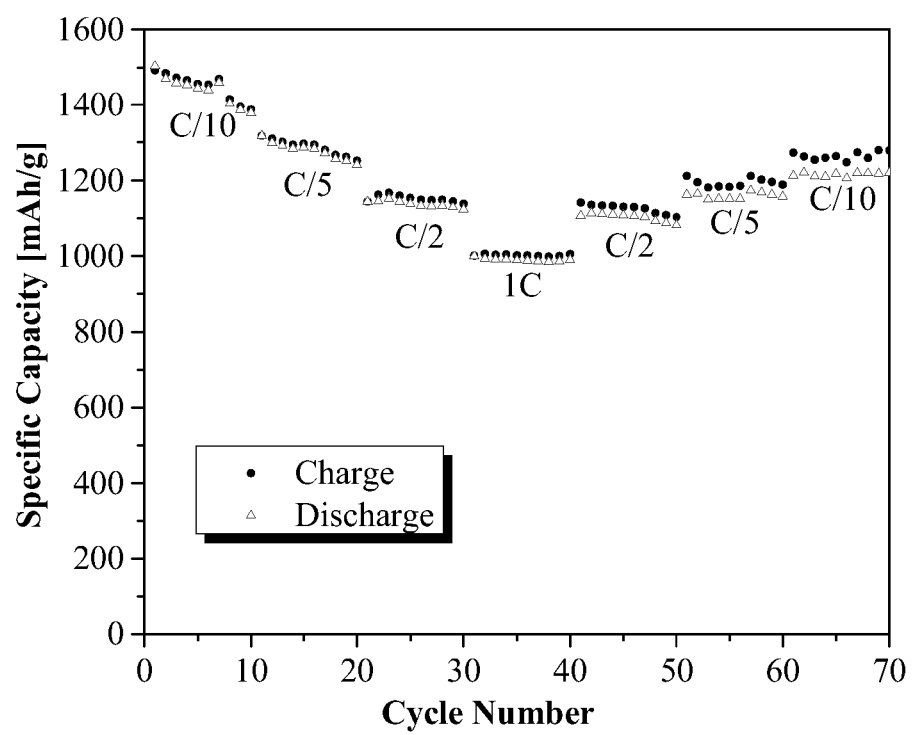
FIG. 9 is graph illustrating the rate capability up to 1C of a Li—S cell containing a porous graphene nanocage as the cathode material, according to the examples.

The electrochemical performance of the Li—S cells is shown in FIGS. 5A-6 for a C/5 rate and in FIGS. 7A-8 for a C/10 rate. All C rates were based on the theoretical capacity of sulfur i.e. 1C=1675 mA/g. At both the C/5 rate and the C/10 rate, excellent cyclability with a near 100% columbic efficiency is achieved with steady discharge and charge potentials. FIG. 9 shows the rate capability of cell, demonstrating that a capacity of greater than 800 mAh/g is maintained at 1C rate. This evidence indicates that good capacity retention is achieved in Li—S cells of the present technology. Without being bound by theory, it is believed that entrapping the sulfur within the porous graphene nanocage prevents the shuttling effect of polysulfides, thereby providing the enhanced cyclability, efficiency, and capacity. It is also believed metastable small $S_2$, $S_3$, and $S_4$ species are confined in between the graphene layers of the nanocage due to the small lattice space, thus preventing formation of the larger $S_8$ species. Because the $S_2$, $S_3$, and $S_4$ species avoid the unfavorable transition to $S_8$ during discharging and charging, enhanced cyclability and greater capacity retention is realized in the Li—S batters of the present technology.

Example 4

The electrochemical performance of a Li-air battery utilizing porous graphene nanocages as the cathode, a 1NM3-LiCF$_3$SO$_3$ electrolyte, and free of a cathodic metal catalyst was evaluated as follows. Electrochemical characterizations were carried out in Swagelok-type cells composed of a lithium metal anode, organic electrolytes impregnated into a glass fiber separator, and a porous cathode (11 mm in diameter). The cathode was prepared by casting a mixture of porous graphene nanocages and Kynar 2801 binder in a weight ratio of 50:50 on an aluminum grid. The average loading of the active materials on the cathode laminate is about 1 mg. The cells were sealed except for the Al grid window that exposed the porous cathode to 1 bar $O_2$ pressure to avoid any negative effects of humidity and $CO_2$. The electrochemical measurements were conducted with a MACCOR cycler in the voltage range of 2.0-4.5 V at a constant current of 100 mA/g. The observed capacity was normalized by the weight of carbon for capacity comparison.

Figure 10A:
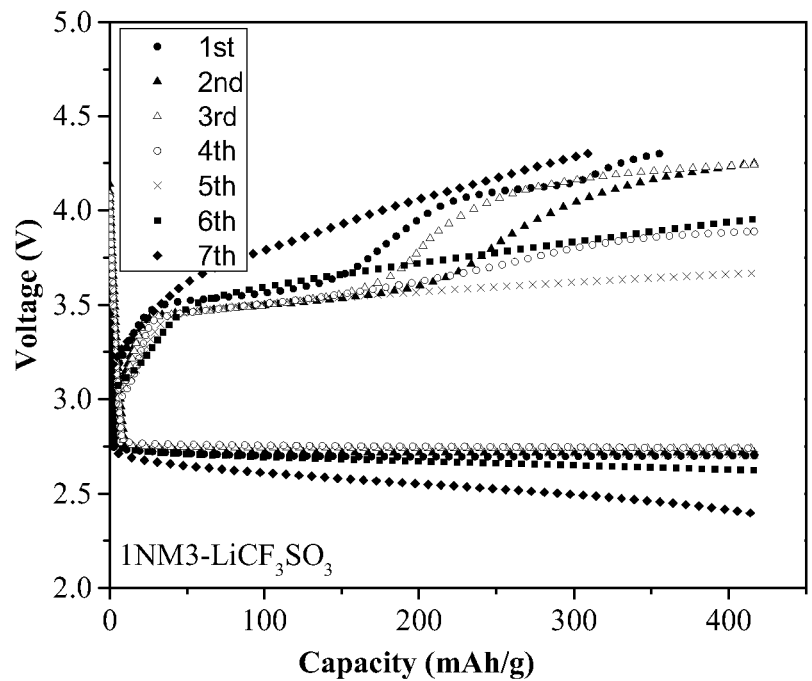
FIGS. 10A and 10B are graphs of the voltage profile during repeated discharge-charge cycles of a Li-air cell with a 1NM3-LiCF$_3$SO$_3$ electrolyte (10A), and the cycle performance of the Li-air cell (10B), according to the examples.
Figure 10B:
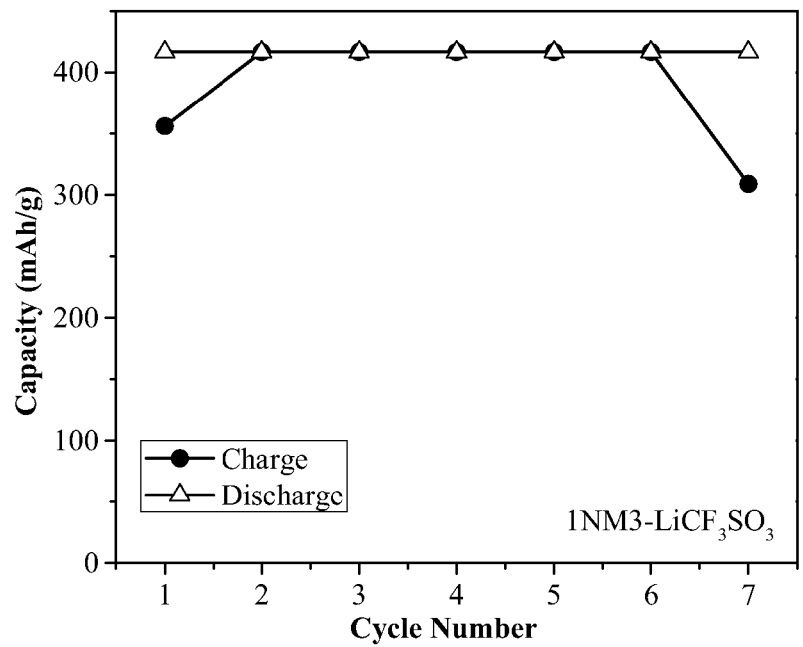

The voltage profile during repeated discharge-charge of this Li-air cell is shown in FIG. 10A; the cycle performance of the Li-air cell is shown in FIG. 10B. As can be appreciated, the Li-air battery displays a low charge potential that gives rise to high electrical efficiency and repeated cycling. Without being bound by theory, it is believed the porous graphene nanocages entrap discharged lithium peroxide and lithium oxide particles, preventing them from reducing the reversibility and energy density of the Li-air battery.

Example 5

A Li-air battery utilizing porous graphene nanocages as the cathode, a TEGDME-LiCF$_3$SO$_3$ electrolyte, and free of a cathodic metal catalyst was made and evaluated in a similar manner as in Example 4. The voltage profile during repeated discharge-charge of this Li-air cell is shown in FIG.

Figure 11A:
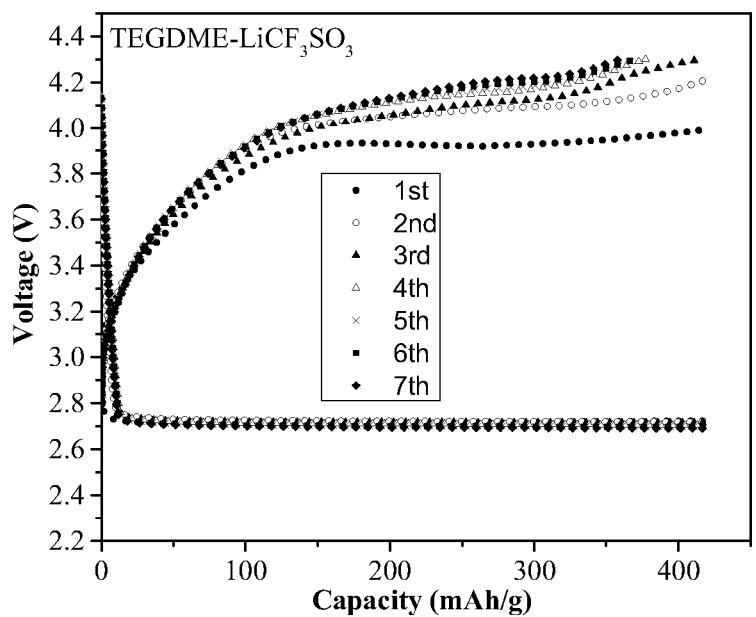
FIGS. 11A and 11B are graphs of the voltage profile during repeated discharge-charge cycles of a Li-air cell with a TEGDME-LiCF$_3$SO$_3$ (11A), and the cycle performance of the Li-air cell (11B), according to the examples.
Figure 11B:
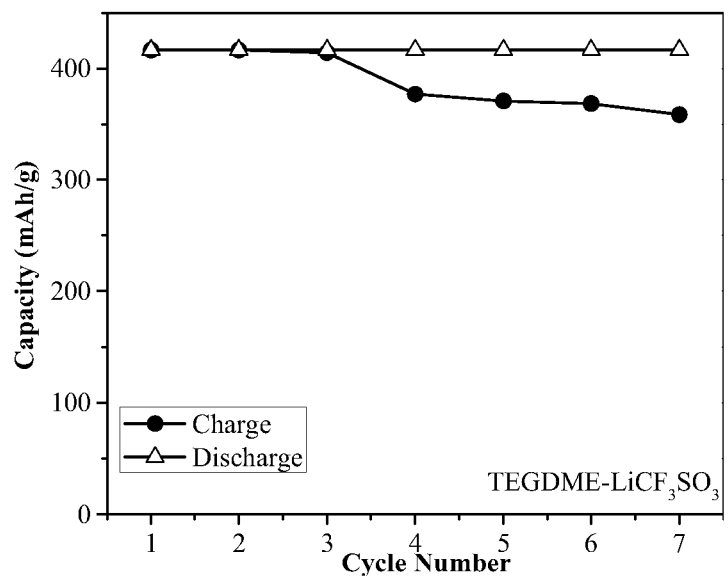

11A; the cycle performance of the Li-air cell is shown in FIG. 11B. As can be appreciated, the Li-air battery displays a low charge potential that gives rise to high electrical efficiency and repeated cycling.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An active material composition comprising:
   a porous graphene nanocage; and
   a source material;
   wherein:
   the source material is a sulfur material and at least a portion of the sulfur material is entrapped within the porous graphene nanocage; and the sulfur material comprises sulfur, $M^1_x S_m$, $M^2_x S_m$, or $M^3_x S_m$;
   $M^1$ is an alkali metal;
   $M^2$ is a transition metal;
   $M^3$ is a metal from groups 13 to 17 of the periodic table;
   each x independently is an integer from 1 to 3; and
   each m independently is an integer from 1 to 10.

2. The composition of claim 1, wherein the sulfur material comprises sulfur, $Li_2S$, $Li_2S_2$, $Na_2S$, $Na_2S_2$, $Li_2S_n$, or $Na_2S_n$, wherein n is an integer from 3 to 6.

3. The composition of claim 1, wherein the composition is free of a cathodic metal catalyst.

4. A lithium-sulfur battery comprising
   a cathode comprising a porous graphene nanocage and a sulfur material, wherein at least a portion of the sulfur material is entrapped within the porous graphene nanocage;
   an anode;
   a lithium salt; and
   an electrolyte.

5. The battery of claim 4, wherein the electrolyte comprises ethylene carbonate, dimethylcarbonate, diethylcarbonate, propylene carbonate, dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ether and fluoro esters, fluoroethylene carbonate, or adiponitrile.

6. The battery of claim 4, wherein the lithium salt comprises of $LiPF_6$, $LiClO_4$, $Li[B(C_2O_4)_2]$, $Li[BF_2(C_2O_4)]$, $Li[PF_4(C_2O_4)]$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, $LiAlF_4$, $LiBF_4$, $Li(FSO_2)_2N$, $Li_2SO_4$, $LiAlO_2$ $LiSCN$, $LiBr$, $LiI$, $LiAsF_6$, $LiB(Ph)_4$, $LiSO_3CH_3$, $Li_2Se_{x''}$, $(LiS_{x''}R)_y$, or $(LiSe_{x''}R)_y$; wherein:
   X is a halogen;
   n is an integer from 0 to 12;
   n' is an integer from 0 to 10;
   x" is an integer from 1 to 20;
   y is an integer from 1 to 3; and
   R is H, alkyl, alkenyl, aryl, ether, F, $CF_3$, $COCF_3$, $SO_2CF_3$, or $SO_2F$.

7. The battery of claim 4 having a capacity of greater than 600 mAh/g.

8. The battery of claim 4, wherein the anodic material comprises a Li metal, $Fe_3O_4$, Mg, Na, a sodium alloy, Si, Si—C, $Mg_2Si$, SiO, a silicon alloy (such as SiCu or SiMo), Sn, SnO, Sb, an antimony alloy, a tin carbon, a composite tin alloy, $Li_4Ti_5O_{12}$, a transition metal oxide, or a lithium metal nitride.

* * * * *

UNITED STATES PATENT AND TRADEMARK OFFICE
CERTIFICATE OF CORRECTION

PATENT NO. : 9,590,248 B2
APPLICATION NO. : 13/796672
DATED : March 7, 2017
INVENTOR(S) : Khalil Amine et al.

It is certified that error appears in the above-identified patent and that said Letters Patent is hereby corrected as shown below:

In the Claims

Claim 1, Column 14, Line 17:
Insert a --,-- as shown:
comprises sulfur, $M^1_xS_m$, $M^2_xS_m$, or $M^3xS_m$;

Claim 5, Column 14, Line 41:
Delete "carbonates" and insert --carbonate--, therefore.

Claim 6, Column 14, Line 49:
Insert a --,-- as shown:
$H_{n'}$, $LiAlF_4$, $LiBF_4$, $Li(FSO_2)_2N$, $Li_2SO_4$, $LiAlO_2$, LiSCN Claim 6, Column 14, Line 50:
Insert the missing series item as shown:
LiBr, LiI, $LiAsF_6$, $LiB(Ph)_4$, $LiSO_3CH_3$, $Li_2S_{x''}$, $Li_2Se_{x''}$, $(LiS_{x''}R)_y$, Signed and Sealed this
Eighth Day of August, 2017

Joseph Matal
*Performing the Functions and Duties of the
Under Secretary of Commerce for Intellectual Property and
Director of the United States Patent and Trademark Office*